United States Patent
Mouly

[19]

[11] Patent Number: 5,878,033

[45] Date of Patent: Mar. 2, 1999

[54] PROCESS AND EQUIPMENT FOR BROADCASTING MESSAGES TO MOBILE RADIO COMMUNICATION STATIONS

[75] Inventor: Michel Mouly, Palaiseau, France

[73] Assignee: Nortel Marta Cellular, France

[21] Appl. No.: 714,108

[22] PCT Filed: Mar. 20, 1995

[86] PCT No.: PCT/FR95/00337

§ 371 Date: Dec. 6, 1996

§ 102(e) Date: Dec. 6, 1996

[87] PCT Pub. No.: WO95/26112

PCT Pub. Date: Sep. 28, 1995

[30] Foreign Application Priority Data

Mar. 22, 1994 [FR] France .................................. 94/03345

[51] Int. Cl.⁶ ...................................................... H04J 3/00
[52] U.S. Cl. ........................ 370/312; 370/329; 370/347; 455/517; 455/561
[58] Field of Search .................................... 370/310, 312, 370/330, 335, 336, 337, 342, 347, 349, 329, 345; 455/33.1, 38.3, 517, 561

[56] References Cited

U.S. PATENT DOCUMENTS

| 5,166,929 | 11/1992 | Lo | 455/517 |
|---|---|---|---|
| 5,274,841 | 12/1993 | Natarajan et al. | 370/337 |
| 5,404,355 | 4/1995 | Raith | 370/95.1 |
| 5,511,067 | 4/1996 | Miller | 455/561 |
| 5,542,116 | 7/1996 | Schellinger | 455/38.3 |
| 5,657,358 | 8/1997 | Paneth et al. | 370/330 |

FOREIGN PATENT DOCUMENTS

| 0 347 355 | 12/1989 | European Pat. Off. | H04H 1/00 |
|---|---|---|---|
| 0 522 631 | 1/1993 | European Pat. Off. | H04Q 7/02 |
| WO94/08432 | 4/1994 | WIPO | H04Q 7/02 |

*Primary Examiner*—Douglas W. Olms
*Assistant Examiner*—Shick Hom
*Attorney, Agent, or Firm*—Evenson, McKeown, Edwards & Lenahan, P.L.L.C.

[57] ABSTRACT

The messages are broadcast successively and at regular intervals to mobile stations on a particular radio channel of the TDMA network. They comprise service messages and schedule messages respectively associated with successive schedule periods, each schedule message including information about the distribution of the service messages which will be broadcast during the associated schedule period. For each service message which will be broadcast during a schedule period, the associated schedule message includes a cue indicating whether this service message has been broadcast during the preceding schedule period. The schedule message furthermore indicates, as the case may be, the broadcasts of service messages which are repetitions of service messages already broadcast during the period. Use in particular in cellular radio telephone networks.

17 Claims, 1 Drawing Sheet

PROCESS AND EQUIPMENT FOR BROADCASTING MESSAGES TO MOBILE RADIO COMMUNICATION STATIONS

BACKGROUND OF THE INVENTION

The present invention relates to a process for transmitting messages from an infrastructure of a radio communication network to mobile stations, as well as the equipment for implementing this process.

The invention applies to the broadcasting, by a base station of the infrastructure, of service messages destined a priori for all the mobile stations situated within the zone of coverage of the base station, each mobile station being able to decide whether or not to receive these service messages. The relevant broadcasting channels can in particular be channels for monitoring radio links if the service messages convey signals for setting up and managing the communications, channels for broadcasting service messages of which the users are intended to be made aware, or else mixed channels on which both these types of service messages will be broadcast.

To illustrate the problems raised by the broadcasting of such messages, in what follows we consider the example of the GSM ("Groupe Special Mobiles") European cellular digital radio communication system, for which there is a message broadcasting service, termed "SMS-CB" standing for "Short Message Service Cell Broadcast". When this service is provided, a particular radio channel is used in each cell and a message is broadcast roughly every two seconds on this channel. A mobile station equipped for this service reads the messages on this channel and displays them on a screen. Typically, the messages are rebroadcast cyclically.

The applications of this service are diverse. Those exploiting the network may use it for information relating to other services, as for example the tariff zones. It may also be used by external service providers, for example to broadcast travel information or weather forecasts.

The service messages are made up of 88 bytes sent in four successive blocks of equal length, the first of which contains four bytes for identifying the message, including 2 bytes, namely 16 bits, which consist of a message category cue. Each block can be received independently by the mobile stations, in the sense that reception of a block may be correct whether the other blocks have or have not been correctly received, and that the mobile station can decide whether or not to receive each individual block.

In the current state of the public specifications for the system, the mobile stations have to receive at least the first blocks of all the messages, failing prior information as to their contents, even if the user is only interested in certain of these messages. This tends to shorten the electrical endurance of the mobile stations, each reception consuming energy. Now, the endurance of portable mobile stations, which are light in weight and therefore have a small battery, is a point of importance to users.

To remedy this drawback, studies are in progress into reducing the number of receptions required, by sending information in advance. The objective is to provide indications in advance enabling the mobile station to know whether or not it is interested in a given message. Cases in which it is not interested are for example messages of a category of no interest to the user (the latter may program his apparatus to, for example, indicate to it that he is not interested in travel information). Another case is that of messages already received. Thus, the messages are rebroadcast regularly, there being many which are not modified for hours or days.

It has in particular been proposed to broadcast, on the same radio channel, schedule messages each giving information about a number of service messages which will be broadcast consecutively after the schedule message. The period for which the service messages catalogued in the schedule message are broadcast is called the schedule period. The information contained in the schedule message includes the categories of the various messages to be broadcast during the schedule period, so that a mobile station which has been programmed to ignore certain categories of message, may refrain from receiving the messages belonging to these categories without even having had to receive their first blocks. The service messages which will be broadcast several times during the schedule period are also identified within the schedule message, so that the mobile station may decide to receive these messages just once during the schedule period if this reception takes place without error. If a transmission error is detected in one of the blocks of the message received during the first broadcast, the mobile station can still decide to receive this block during the repetition of the message.

Let us consider for example the case in which the broadcasts to occur during the schedule period are those illustrated in table I. The content of the schedule message is then as indicated in table II.

After the header, the information relating to the broadcasts of messages are ranked in the sequence in which these broadcasts will occur. For each broadcast, the first bit indicates whether this is a first broadcast of a message during the schedule period (0) or a repetition (1), and the remainder of the field designates the category of the message, coded on 15 bits so as to obtain fields of 2 bytes (in the case of GSM, this entails omitting one bit from the complete category cue which contains 16 bits; it is therefore not impossible that there may be a few cases ambiguous to the mobile stations).

TABLE I

| Broadcasting sequence | Message to be broadcast | Category of the message |
|---|---|---|
| 1 | M1 | c1 |
| 2 | M2 | c2 |
| 3 | M3 | c1 |
| 4 | M3 | c1 |
| 5 | M2 | c2 |
| 6 | M1 | c1 |

TABLE II

| Header (essentially the number of broadcasts to occur during the schedule period, here: 6) | |
|---|---|
| 0 | c1 |
| 0 | c2 |
| 0 | c1 |
| 1 | c1 |
| 1 | c2 |
| 1 | c1 |

If a mobile station receiving this schedule message is interested only in category c1, it may refrain from receiving the messages in the $2^{nd}$ and $5^{th}$ positions. However, it must read at least the first blocks of the messages in the $1^{st}$ and $3^{rd}$ positions. If, for example, the message M3 has been correctly received by the mobile station before the broadcasting of the schedule message, the mobile station must receive this same message again, at least its first block, in a superfluous manner in the $3^{rd}$ position of the current period. Moreover, if the mobile station misses reception of the first block of this message in the $3^{rd}$ position, it will also have to receive in a superfluous manner at least the first blocks of the messages broadcast in the $4^{th}$ and $6^{th}$ positions.

The schedule messages which have been proposed are therefore not optimal in terms of economy of the energy resources of the mobile stations. A main objective of the invention is to afford a solution which performs better in this respect.

SUMMARY OF THE INVENTION

The invention thus proposes a process for transmitting messages from an infrastructure of a time division multiple access radio communication network to mobile stations. The said messages are broadcast successively and at regular intervals to the mobile stations on a particular radio channel, and comprise service messages and schedule messages respectively associated with successive schedule periods. Each schedule message includes information about the distribution of the service messages which will be broadcast during the associated schedule period. In respect of each service message which will be broadcast during a schedule period, the associated schedule message includes a cue indicating whether this service message has been broadcast during the preceding schedule period.

In this way, when a mobile station has received the schedule messages associated with two consecutive periods and it knows it has received, during the first of these two periods or previously, each of the messages of a category of interest which are catalogued in the schedule message associated with the first period, it can ignore during the second period the broadcasts of messages of this category which are indicated in the associated schedule message as having already been broadcast during the preceding period. As, in a certain number of applications, the content of the service messages changes only relatively rarely (typically, they remain unchanged for hours or days whereas the duration of a schedule period is of the order of a minute), the improvement in the endurance of the mobile stations is very appreciable.

Coming back to the example envisaged in table I, the content of the schedule message can then be that indicated in table III.

TABLE III

| Header (essentially the number of broadcasts to occur during the schedule period, here: 6) | | |
|---|---|---|
| 1 | 0 | c1 |
| 0 | 0 | c2 |
| 0 | 0 | c1 |
| 0 | 1 | c1 |
| 0 | 1 | c2 |
| 1 | 1 | c1 |

After the header, the information relating to the broadcasts of messages are ranked in the sequence in which these broadcasts will occur, again some other sequence could be adopted, determined in a manner known to the mobile stations on the basis of the sequence in which the broadcasts will occur. For each broadcast, the value of the first bit indicates whether it corresponds to a service message broadcast during the preceding schedule period (0) or not (1), the value of the second bit indicates whether the broadcast is a repetition of a service message already broadcast during the period in question (1) or not (0), and the remainder of the field is occupied by the category cue representing the type of message.

In table III, by preference we have retained the indication (second bit) of the repetitions of the messages broadcast several times during the same schedule period, this indication remaining useful in respect of cases in which the mobile station misses the first reception, and not duplicating that (first bit) of the messages which have been broadcast during the preceding schedule period. The two bits therefore give rise to four possibilities of interpretation: the first broadcasts during the schedule period of messages which have not been broadcast during the preceding period (10), the first broadcasts during the schedule period of messages broadcast during the preceding period (00), and the repetitions during the period of the two preceding cases of broadcast (01 and 11). It would, however, be possible to make do with three possibilities by according no significance to the value of the first bit when the second has the value 1.

According to a second aspect of the invention, applicable when certain at least of the messages may be broadcast several times during the schedule period, there is provision for the schedule message to include, as the case may be, cues indicating the broadcasts of service messages which are repetitions of messages already broadcast during the said period, and furthermore, in respect of each of these broadcasts, the sequence number of an earlier broadcast of the message in question during the said period. Thus, the mobile stations know exactly which message is repeated and when and can therefore, in case of a problem with reception during the first broadcast, chose exactly which message to listen to again.

It will be observed firstly that this second aspect may be used independently of the insertion of cues indicating whether the service messages to be broadcast have already been broadcast before the schedule message. Table II can then be modified as indicated in table IV. The category cues corresponding to the repetitions ($1^{st}$ bit of the field=1) are replaced by the sequence number of the corresponding first broadcasts (for the $(p+1)^{th}$ broadcast of the same message during the period, it would be possible to take the sequence number for any one of the p preceding broadcasts), this being advantageous in terms of volume of information since the sequence numbers are normally codeable on fewer bits than the category data (typically 6 bits instead of 15 if a capacity of the order of 40 messages per schedule period is provided for). However, in particular, under the hypothesis that a mobile station interested in category c1 misses reception of the message transmitted in $1^{st}$ position, it could refrain from receiving the message broadcast in $4^{th}$ position, contrary to the case in which the schedule message has the format illustrated by table II.

Preferably, the second aspect above will however be combined with the insertion of cues indicating whether the messages to be broadcast have already been so during the preceding schedule period. Again in the case of table I, the content of the schedule message may then be that indicated in table V.

The format is the same as that of table III, except that the cue appearing at the end of the field for each broadcast consists either of the category cue if the broadcast is not a repetition of a message already broadcast during the period (second bit=0), or of the sequence number of an earlier broadcast of the message in question during the period if this is a repetition (second bit=1). It will be noted that the significance of the first bit of the fields whose second bit has the value 1 may be changed without losing information, since the sequence number which follows makes it possible to fetch from the start of the field corresponding to this number the bit indicating whether the message in question has been broadcast during the preceding schedule period.

TABLE IV

Header
(essentially the number of broadcasts to occur during the schedule period, here: 6)

| | |
|---|---|
| 0 | c1 |
| 0 | c2 |
| 0 | c1 |
| 1 | 3 |
| 1 | 2 |
| 1 | 1 |

TABLE V

Header
(essentially the number of broadcasts to occur during the schedule period, here: 6)

| | | |
|---|---|---|
| 1 | 0 | c1 |
| 0 | 0 | c2 |
| 0 | 0 | c1 |
| 0 | 1 | 3 |
| 0 | 1 | 2 |
| 1 | 1 | 1 |

If a mobile station interested in category c1, which has just been switched on or has just entered the cell (and therefore has not yet received the messages M1 and M3), misses reception of the message broadcast in $1^{st}$ position and correctly receives that broadcast in $3^{rd}$ position, it will be able, by virtue of the information received in the schedule message illustrated by table V, to ignore the message broadcast in $4^{th}$ position and receive only that broadcast in $6^{th}$ position.

When each schedule message is divided into several blocks broadcast successively on the radio channel, and which are receivable independently of one another by the mobile stations, there is advantageously provision for the first block of the schedule message to include a header comprising an indication of the number of broadcasts of messages during the associated schedule period, and a field indicating new broadcasts comprising a succession of bits each indicating, in respect of one of the broadcasts enumerated in the header, whether it is the first broadcast, during the said period, of a service message which has not been broadcast during the preceding schedule period, and for the schedule message to include, after the header and the field indicating new broadcasts, information relating to the first broadcasts, during the said period, of service messages which have not been broadcast during the preceding schedule period, and then information relating to the other broadcasts to occur during the said schedule period.

Thus, the information of relevance to the new service messages to be broadcast during the period to come are grouped at the start of the schedule message. Here, "new" is understood to mean a message which has not been broadcast during the preceding schedule period, but which may nevertheless have been previously. Usually, these new broadcasts will be relatively few in number in view of the low frequency of renewal of the service messages and of the length of the schedule periods, so that the information pertaining thereto will be able to fit into the first block or the first blocks of the schedule message. The mobile stations which know that they have already correctly received all the messages of interest to them and which have been broadcast during the preceding period can then refrain from receiving the other blocks of the schedule message. The economy in terms of reception now relates to the schedule message itself rather than to the service messages alone.

In the case considered in table I, the schedule message may have the content indicated in table VI, distributed over one or more blocks.

TABLE VI

Header
(essentially the number of broadcasts to occur during the schedule period, here: 6)

| | | |
|---|---|---|
| | 100000 | |
| | c1 | |
| 1 | 1 | 6 |
| 0 | | c2 |
| 0 | | c1 |
| 1 | | 3 |
| 1 | | 2 |

After the header comes a field indicating new broadcasts whose successive bits indicate, for each broadcast indexed in the header, whether it is the first broadcast, during the schedule period, of a service message which has not been broadcast during the preceding period (1) or not (0). The succeeding fields (just one in the example considered) provide the category cues for the messages forming the subject of the new broadcasts indicated in the field indicating new broadcasts. In the example considered may thus be found the category cue c1 for the message M1 which will be broadcast for the first time in $1^{st}$ position in the schedule period. The succeeding fields (just one in the example) provide information relating to the broadcasts, ordered in the sequence in which they will occur, which will be repetitions of the messages "newly" broadcast during the schedule period. This information comprises a bit of value 1 which indicates that the broadcast is a repetition of a message already broadcast, the sequence number of the first broadcast of the message during the schedule period (or of any one of the first p broadcasts if this is the $(p+1)^{th}$ broadcast of the same message during the period) (1 in the example), and the sequence number of the repetition (6 in the example). The other fields of the schedule message are relevant to the broadcasts other than the broadcasts of the service messages which have not been broadcast during the preceding schedule period. These fields comprise, for each of these broadcasts relevant to a service message, ordered in the sequence in which they will occur (some other sequence would be possible), a bit indicating whether the message has already been broadcast during the schedule period (1) or not (0), and a cue consisting either of the category cue for the message if the first bit equals 0, or of the sequence number of an earlier broadcast of the message in question during the schedule period if the first bit equals 1.

In the example of table VI, if the first four fields (up to the digit 6) are fitted into the first block of the schedule message, a mobile station having received all the messages of interest to it which have been broadcast during the preceding period can ignore the succeeding blocks of the schedule message. The number of useful receptions in respect of the schedule message is then reduced by three quarters if there are four blocks per message.

As a variant, provision may be made for the successive bits of the field indicating new broadcasts each to indicate, in respect of one of the broadcasts enumerated in the header, whether it corresponds to a service message already broadcast during the preceding schedule period, and for the schedule message to include, after the header and the field indicating new broadcasts, information relating to the broadcasts of service messages which have not been broadcast during the preceding schedule period, and then information relating to the broadcasts other than the broadcasts of the service messages which have not been broadcast during the preceding schedule period.

Table VI is then modified as indicated in Table VII.

TABLE VII

| Header |
| --- |
| (essentially the number of broadcasts to occur during the schedule period, here: 6) |

| | |
| --- | --- |
| 100001 | |
| 0 | c1 |
| 1 | 1 |
| 0 | c2 |
| 0 | c1 |
| 1 | 3 |
| 1 | 2 |

In the field indicating new broadcasts, each bit equals 1 in respect of the broadcasting of a service message which has not been broadcast during the preceding period and 0 in the contrary case. The succeeding fields (2 in the example considered) are each relevant to a broadcast of a service message not broadcast during the preceding period: the first bit is 0 for the first broadcasts of a message during the schedule period and 1 for the repetitions of messages already broadcast during this period. The cue occupying the remainder of the field consists of the category cue for the message when the first bit equals 0 (first broadcast) or of the sequence number of an earlier broadcast of the message in question during the said period when the first bit equals 1 (repetition). The mobile station is able to retrieve the sequence number of each repetition on the basis of the position of the bits which equal 1 in the string of bits of the field indicating new broadcasts. By comparison with the format of table VI, that of table VII has the advantage of making it possible to code on one byte only the repetitions of the "new" messages when, for example, the sequence numbers are codeable on 6 bits and the category cues on 15 or 16 bits.

The subject of the invention is also a base station for time division multiple access cellular radio communication network, comprising radio transmission and reception means for communicating with mobile stations on several radio channels, and means for forming a succession of messages broadcast at regular intervals on one of the radio channels, these messages comprising service messages and schedule messages constructed by the said forming means in accordance with the process set forth above.

A time division multiple access mobile radio communication station for the implementation of the invention comprises transmission and reception means for communicating with a base station of a cellular radio communication network broadcasting at regular intervals on a particular radio channel service messages and schedule messages constructed in accordance with the process set forth above, means for receiving and interpreting the said messages operating when the mobile station is not communicating, and means for analyzing schedule messages in order to interrupt the operation of the receiving and interpreting means at the moments in each schedule period, which are determined on the basis of the associated schedule message, at which the base station will rebroadcast a service message already broadcast during the preceding schedule period and which the mobile station has already received during the preceding schedule period or previously.

DESCRIPTION OF THE PREFERRED EMBODIMENTS

The invention is described below in its application to the management of the broadcasting of service messages destined for users of the GSM European cellular network, which is customarily referred to by the initials SMS-CB ("Short Message Service—Cell Broadcast"), and which forms the subject of the Technical Specifications published by the ETSI (European Telecommunication Standard Institute) under the references TS GSM 03.41 (draft pr ETS300 537) and TS GSM 04.12 (draft pr ETS300 560), to which reference may be made. GSM calls upon the technique of time division multiple access TDMA.

Figure 1:
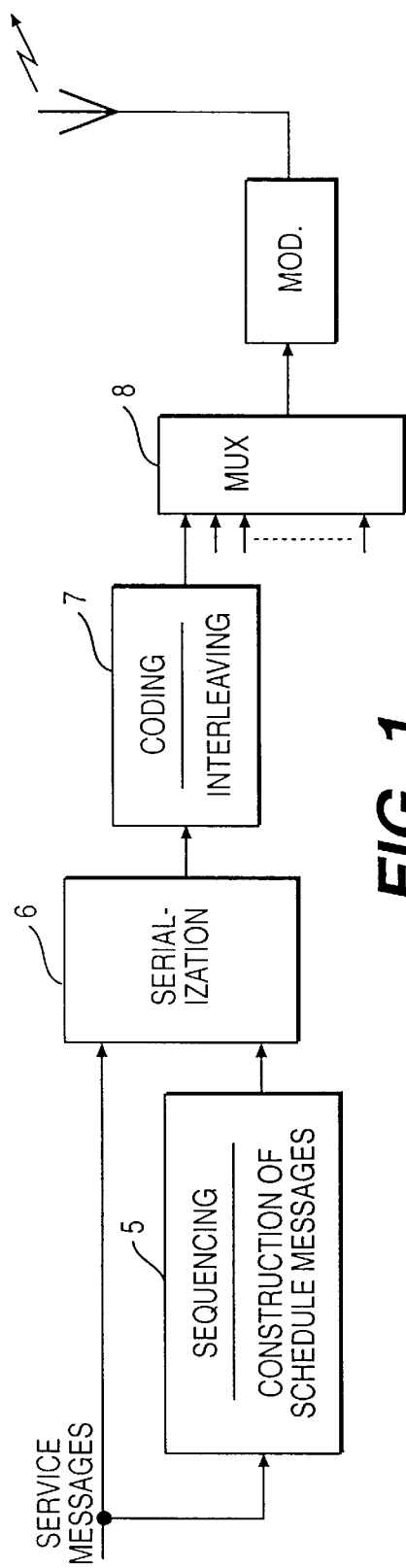
FIG. 1 is a partial schematic diagram of a base station according to the invention, showing the parts relevant to the invention.

Each service message has a length of 88 bytes distributed into 4 blocks of 23 bytes (each including one level-2 byte). In each base station of the network (FIG. 1), the service messages are delivered to a management unit 5 which determines the sequence in which they will be broadcast, and which constructs the schedule messages to be intercalated into this sequence. The service and schedule messages are serialized by the unit 6 so as to form the stream of information bits to be broadcast over the broadcasting channel CBCH provided for this purpose.

As provided for within the GSM framework, the channel CBCH occupies half the down-link capacity of a dedicated SDCCH ("Stand-alone dedicated control channel") type signalling channel. Reference may be made in this regard to the Technical Specification published by the ETSI under the reference TS GSM 05.02 (draft pr ETS300 574). As symbolized by the unit 7 in FIG. 1, each block of 8×23=184 bits of a message is subjected to error correcting coding and to an interleaving, so as to be transformed into a block of 456 bits which consists of 4 interlaced packets of 114 bits each to be broadcast in one time slot (0.577 ms) of the TDMA frame. In a TDMA multiframe of GSM, consisting of 51 frames each of 8 time slots, there are four time slots reserved for the SDCCH channel, which lie in four consecutive frames. The duration of broadcasting of a message block is therefore 4×8×0.577 ms=18.46 ms, and the constant time interval separating two consecutive message broadcasts is, given that only half the capacity of the SDCCH channel is used, 2×4×51×8×0.577 ms ~1.88 s. The frames are assembled by the multiplexer 8, the output from which is modulated at high frequency for radio broadcasting in the cell served by the base station. In practice, the units 5 and 6 which form the messages to be broadcast may be situated on the same site as the remainder of the base station, or be situated on the site of the base station controller (BSC).

Figure 2:
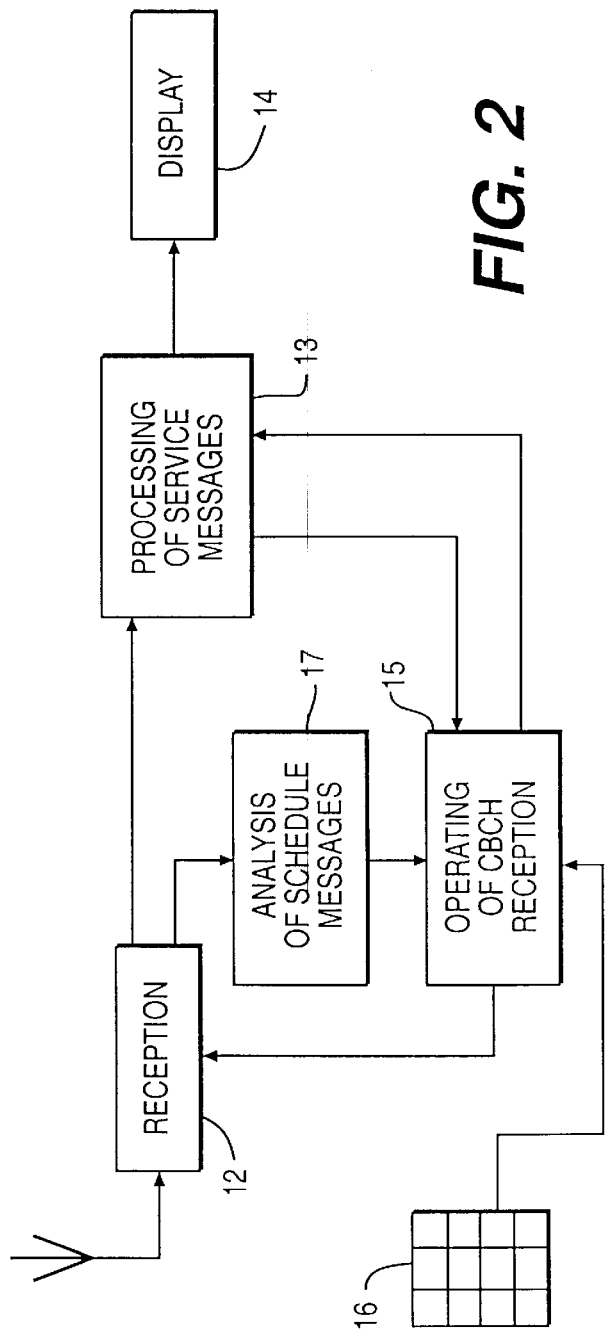
FIG. 2 is a partial schematic diagram of a mobile station according to the invention, showing the parts relevant to the invention.

FIG. 2 illustrates the complementary equipment in a mobile station. The mobile station processes the radio signal picked up so as to extract from it the information carried by the channels which are relevant to it. When the mobile station is on without being engaged in communication, the receiving unit 12, of conventional type, monitors a control channel BCCH broadcast by the base station, in order to synchronize itself relative to the TDMA frame, and a paging channel (PCH) on which the base station can warn it of calls which are destined for it. The base station represented in FIG. 2, which is adapted to the reception of the SMS-CB messages, also monitors the broadcasting channel CBCH. The receiving unit 12 can reconstruct block by block the information bits of the service messages: by virtue of the synchronization achieved by listening on the control channel BCCH, the unit 12 extracts the samples of the time slots allotted to the channel CBCH, and carries out the deinterleaving and decoding operations which are the duels of the coding and interleaving operations carried out by the unit 7 of the base station. The unit 12 delivers the 88-byte blocks of the service messages to a processing unit 13 which interprets these messages in accordance with a preset protocol so as to display them on a screen 14 of the mobile station. The service messages may also be stored temporarily. The blocks are broadcast separated with a time interval sufficient for them to be received independently of one another by the mobile stations.

An operating unit 15 is provided in the mobile station for operating the receiving unit 12 and the processing unit 13 at appropriate instants. In particular, the units 12 and 13 are disabled as soon as a communication involving the mobile station has been set up. The user can program the operating unit 15 via the keypad 16 so as to receive only certain categories of service messages. During broadcasts of messages not belonging to the selected categories, the operating unit 15 disables the units 12 and 13 in order to economize on the energy resources of the mobile station. The schedule message relating to the current period may not have been received by the mobile station owing to an error in the transmission of the schedule message, or because the mobile station has only just been switched on or has only just entered the cell. The operating unit 15 then examines the identification cues which are contained in the first block of the current service message, and which are supplied to it by the processing unit 13. If these cues reveal that the message does not belong to the selected categories, the operating unit 15 decides not to receive the other three blocks of the message.

The mobile station also includes a unit 17 for analyzing the schedule messages in order to indicate to the operating unit 15 the instants at which there is reason to operate the units 12 or 13 depending on the content of each schedule message. The schedule messages may in particular be identified on the basis of the content of the $23^{rd}$, level 2, byte of each block. Once it has received a schedule message, the mobile station can ignore the service message broadcasts for which the schedule message supplies category cues other than those selected, as well as the repetitions, indicated in the schedule message, of service messages which it has already received correctly during the associated schedule period. After receiving the schedule message associated with the next period, the mobile station can furthermore ignore the service messages broadcast during this next period, and indicated in the schedule message as having been broadcast during the preceding period, provided that these service messages have been correctly received during the preceding period or previously.

The schedule message constructed by the management unit 5 of the base station has, in the example considered, the byte by byte structure illustrated in table VIII, which corresponds to the format previously presented in table VI (the format of table III, IV, V or VII could also be used).

The first two bytes (header) indicate the start of the schedule period and the number of broadcasts which will occur during the period (40 at most).

The field indicating new broadcasts is made up of 40 bits. The $i^{th}$ bit of this field has the value 1 if the broadcast to occur in $i^{th}$ position during the schedule period is the first broadcast, during this period, of a service message which has not been broadcast on the channel CBCH during the preceding period, and the value 0 in the contrary case. If n broadcasts are enumerated in the header, the last 40-n bits of the field indicating new broadcasts are in reserve.

TABLE VIII

| Byte No. | Content |
| --- | --- |
| 1 and 2 | Header |
| 3 to 7 | Field indicating new broadcasts |
| 8 to 8 + 2k − 1 | Categories of the k messages forming the subject of the k new broadcasts |
| 8 + 2k to 8 + 2 (k + r) − 1 | Information about the r repetitions of messages newly broadcast during the schedule period |
| 8 + 2 (k + r) to 87 | Information about the other broadcasts (especially messages broadcast during the preceding schedule period) |
| 88 | Reserve |

The succeeding fields (bytes 8 to 8+2k-1) are each made up of two bytes in respect of a new broadcast to occur, making it possible to accommodate each of the 16 bits of the category cue for the message. These two-byte fields are arranged in the order in which the relevant broadcasts will occur during the schedule period, the mobile stations being able to reconstruct the corresponding positions on the basis of the bits of the field indicating new broadcasts.

The succeeding fields (bytes 8+2k to 8+2(k+r)−1) are also made up of two bytes each, and relate, in the order in which they will occur, to the repetitions of the service messages newly broadcast during the schedule period. Each of these fields includes firstly two bits of value 10, the first of which indicates that the relevant broadcast will be a repetition, followed by the sequence number (6 bits) of the first broadcast of the message in question during the period, followed by the sequence number (6 bits) of the repetition, the last two bits of the field being in reserve.

The succeeding fields (bytes 7+2(k+r) to 87; in fact, only bytes 8+2(k+r) to 8+2n−1 carry useful information) are also made up of two bytes each, and relate, in the order in which they will occur, to the broadcasts other than the broadcasts of the service messages which have not been broadcast during the preceding schedule period. A field corresponding to a first broadcast of a service message during the period has its first bit at 0, and the 15 succeeding bits represent the category cue for the message. The $16^{th}$ bit of the complete category cue, specified for GSM, is truncated, this possibly giving rise to a few ambiguous cases, in fact highly improbable given that 15 bits already code 32,768 possibilities. If this happens, the mobile station will be induced to receive the first block of a message which may not be of interest to it. This is only relevant in cases in which the message in question has not been received during the preceding period. This drawback is therefore minor. A field corresponding to a broadcast of a service message already broadcast after the schedule message and during the preceding period has its first bit at 1 and its second bit at 0 or 1; the last 6 bits of its first byte code the sequence number of the first broadcast of the message which occurred during the schedule period, and its second byte can provide an additional message identification parameter, possibly selectable via the value of the second bit of the first byte.

With this structure of the schedule message, a mobile station which knows that it has previously received all the service messages of the selected categories can make do with receiving only the first block of the schedule message as soon as 8+2(k+r)−1≦22, i.e. k+r≦7 (the most frequent case). If 7<k+r≦18, this mobile station listens only to the first two blocks of the schedule message, and if 18<k+r≦29 to the first three blocks.

The error correction code which has been introduced by the unit 7 of the base station and which is decoded by the mobile station makes it possible to determine when the latter misses reception of a block of a service message which is of interest to it. A reception error can also be detected when the processing unit 13 is unsuccessful in interpreting a block. In the event of an error, if the schedule message has indicated one or more repetitions of the message in question, the operating unit 15 can operate the units 12 and 13 just in order to receive the repetition of the missed block.

If the transmission errors are considered to be sufficiently improbable, the mobile station can also adopt the strategy consisting in receiving a single block of the message as soon as k≦7, two blocks when 7<k≦18 and three blocks when 18<k≦29, and in ignoring the repetitions whose indications it might not have received owing to the truncating of the schedule message.

The schedule message structure presented in table VIII leads to relatively simple coding and decoding procedures since a field of constant length (2 bytes) is allocated to each broadcast to occur. It will however be observed that, in respect of the broadcasts which are repetitions of messages already broadcast during the relevant schedule period and the preceding period, it would be possible to make do with a single byte containing a bit at 1 indicating that this is a repetition, 6 bits coding the sequence number of an earlier broadcast of the message in question during the period and a reserve bit. Proceeding thus makes it possible to catalogue more broadcasts per schedule message. It is also possible to envisage headers over one byte only in order to save volume of information.

It will be possible to make provision for a schedule message to be broadcastable several times during the associated schedule period, perhaps with a few modifications. In the case of table VIII, the repetitions of the schedule message may be indicated in turn by an appropriate code in one of the fields situated between bytes 8+2(k+r) and 87. One possibility is to reserve the case in which the first 2 bits of such a field are equal to 1 to indicate to a mobile station operating under discontinuous reception of the channel CBCH and receiving the schedule message that it can refrain from receiving the broadcast forming the subject of this information field. These fields beginning with 11 can correspond to broadcasts destined for mobile stations not operating under discontinuous reception of the channel CBCH or to repetitions of the schedule message, or else to virgin messages. Thus, the mobile stations which listen to the repetition of a schedule message are those which are interested in the schedule message and which have not received it correctly during a preceding broadcast.

I claim:

1. Process for transmitting messages from an infrastructure of a time division multiple access radio communication network to mobile stations, said messages being broadcast successively and at regular intervals to the mobile stations on a particular radio channel, and comprising service messages and schedule messages respectively associated with successive schedule periods, each schedule message including information about a distribution of the service messages which will be broadcast during the associated schedule period, wherein for each service message which will be broadcast during a schedule period, the associated schedule message includes a cue indicating whether said service message has been broadcast during the preceding schedule period.

2. Process according to claim 1, wherein, certain ones of at least the service messages may be broadcast several times during one schedule period, and the schedule message associated with said one schedule period includes further cues indicating, as the case may be, the broadcasts of service messages which are repetitions of service messages already broadcast during said one schedule period.

3. Process according to claim 2, wherein the schedule message includes a header comprising an indication of a number of broadcasts of messages during the associated schedule period followed by, for each of said broadcasts during the associated schedule period which relates to a service message, a bit whose value indicates whether the service message has been broadcast during the preceding schedule period, a bit whose value indicates whether the broadcast is a repetition of a service message already broadcast during said associated schedule period, and a category cue representing a type of service message, the sequence of said bits and of said category cues in the schedule message being determined from the sequence in which the broadcasts will occur during said associated schedule period.

4. Process according to claim 2, wherein, when the schedule message includes one of said further cues indicating that the broadcast of one of said service messages is a repetition of said one of said service messages already broadcast during the associated schedule period, it furthermore includes, in respect of said repetition, a sequence number of an earlier broadcast of said one of said service messages during said associated schedule period.

5. Process according to claim 4, wherein the schedule message includes a header comprising an indication of the number of broadcasts of messages during the associated schedule period followed by, for each of said broadcasts during the associated, schedule period which relates to one of said service messages, a first bit whose value indicates whether said one of said service messages has been broadcast during the preceding schedule period, a second bit whose value indicates whether the broadcast is a repetition of said one of said service messages already broadcast during said associated schedule period, and another cue consisting either of a category cue representing a type of service message if the broadcast is not a repetition of said one of said service messages already broadcast during said associated schedule period, or otherwise of a sequence number of an earlier broadcast of said one of said service messages during said associated schedule period, and wherein the sequence of said first and second bits, of said category cue and of said sequence number in the schedule message is determined from the sequence in which the broadcasts will occur during said associated schedule period.

6. Process according to claim 1, wherein each schedule message is divided into several blocks broadcast successively on the radio channel and being receivable independently of one another by the mobile stations, wherein the first block of the schedule message includes a header comprising an indication of the number of broadcasts of messages during the associated schedule period, and a new broadcast-indicating field comprising a succession of bits each indicating, in respect of one of the broadcasts enumerated in the header, whether said one of the broadcasts is the first broadcast, during said associated schedule period, of a service message which has not been broadcast during the preceding schedule period, and wherein the schedule message includes, after the header and the new broadcast-indicating field, information relating to the first broadcasts, during said associated schedule period, of service messages which have not been broadcast during the preceding schedule period, and then information relating to the other broadcasts to occur during said associated schedule period.

7. Process according to claim 6, wherein said information relating to the first broadcasts, during said associated schedule period, of service messages which have not been broadcast during the preceding schedule period comprises category cues representing types of service messages forming the subject of said first broadcasts.

8. Process according to claim 6, wherein the schedule message includes, after said information relating to the first broadcasts, during said associated schedule period, of service messages which have not been broadcast during the preceding schedule period, information relating to the broadcasts which are repetitions of service messages already broadcast during said associated schedule period and which have not been broadcast during the preceding schedule period, and then information relating to the broadcasts other than broadcasts of service messages which have not been broadcast during the preceding schedule period.

9. Process according to claim 8, wherein said information relating to the broadcasts which are repetitions of service messages already broadcast during said associated schedule period and which have not been broadcast during the preceding schedule period comprises, in respect of each of said broadcasts which are repetitions, at least one bit whose value indicates that the service message of said broadcast has already been broadcast during said associated schedule period, a first sequence number relating to an earlier broadcast of said service message during said associated schedule period, and a second sequence number relating to said repetition.

10. Process according to claim 1, wherein each schedule message is divided into several blocks broadcast successively on the radio channel and receivable independently of one another by the mobile stations, wherein the first block of the schedule message includes a header comprising an indication of the number of broadcasts of messages during the associated schedule period, and a new broadcast-indicating field comprising a succession of bits each indicating, in respect of one of the broadcasts enumerated in the header, whether the service message of said one of the broadcasts has already been broadcast during the preceding schedule period, and wherein the schedule message includes, after the header and the new broadcast-indicating field, information relating to the broadcasts of service messages which have not been broadcast during the preceding schedule period, and then information relating to the broadcasts other than broadcasts of service messages which have not been broadcast during the preceding schedule period.

11. Process according to claim 10, wherein said information relating to the broadcasts of service messages which have not been broadcast during the preceding schedule period comprises, in respect of each one of said broadcasts ordered in a sequence determined from the sequence in which they will occur during said associated schedule period, a bit whose value indicates whether the service message of said one of said broadcasts has already been broadcast during said associated schedule period, and another cue consisting either of a category cue representing a type of service message if the service message of said one of said broadcasts has not already been broadcast during said associated schedule period, or otherwise of a sequence number of an earlier broadcast of said service message during said associated schedule period.

12. Process according to claim 8, wherein said information relating to the broadcasts other than broadcasts of service messages which have not been broadcast during the preceding schedule period comprises, for each one of said other broadcasts relating to one of said service messages, ordered in a sequence determined from the sequence in which said other broadcasts will occur during said associated schedule period, a bit whose value indicates whether said one of said other broadcasts is a repetition of said one of said service messages already broadcast during said associated schedule period, and another cue consisting either of a category cue representing a type of service message if said one of said one of said service messages has not already been broadcast during said associated schedule period, or otherwise of the sequence number of an earlier broadcast of said one of said service messages during said associated schedule period.

13. Process for transmitting messages from an infrastructure of a time division multiple access radio communication network to mobile stations, said messages being broadcast successively and at regular intervals to the mobile stations on a particular radio channel, and comprising service messages and schedule messages respectively associated with successive schedule periods, each schedule message including information about a distribution of the service messages which will be broadcast during the associated schedule period, wherein certain ones of at least the service messages may be broadcast several times during one schedule period, and the schedule message associated with said one schedule period includes cues indicating, as the case may be, the broadcasts of service messages which are repetitions of service messages already broadcast during said one schedule period, and wherein, when the schedule message includes a cue indicating that the broadcast of one of said service messages is a repetition of said one of said service messages already broadcast during the associated schedule period, it furthermore includes, in respect of said repetition, a sequence number of an earlier broadcast of said one of said service messages during said associated schedule period.

14. Base station for a time division multiple access cellular radio communication network, comprising radio transmission and reception means for communicating with mobile stations on several radio channels, and means for forming a succession of messages broadcast at regular intervals on one of the radio channels, said messages comprising service messages and schedule messages respectively associated with successive schedule periods, each schedule message including information about a distribution of the service messages which will be broadcast during the associated schedule period, wherein for each service message which will be broadcast during a schedule period, the associated schedule message includes a cue indicating whether said service message has been broadcast during the preceding schedule period.

15. Time division multiple access mobile radio communication station comprising transmission and reception means for communicating with a base station of a cellular radio communication network broadcasting at regular intervals on a particular radio channel service messages and schedule messages respectively associated with successive schedule periods, each schedule message including information about a distribution of the service messages which will be broadcast during the associated schedule period, wherein for each service message which will be broadcast during a scheduled period, the associated schedule message includes a cue indicating whether said service message has been broadcast during the preceding schedule period, the mobile station further comprising means for receiving and interpreting said messages operating when the mobile station is not communicating, and means for analyzing schedule messages in order to interrupt the operation of the receiving and interpreting means at moments in each schedule period, which are determined on the basis of the associated schedule message, at which the base station will rebroadcast one of said service messages already broadcast during the preceding schedule period and which the mobile station has already received during the preceding schedule period or previously.

16. Base station for a time division multiple access cellular radio communication network, comprising radio transmission and reception means for communicating with mobile stations on several radio channels, and means for forming a succession of messages broadcast at regular intervals on one of the radio channels, said messages comprising service messages and schedule messages respectively associated with successive schedule periods, each schedule message including information about a distribution of the service messages which will be broadcast during the associated schedule period, wherein certain ones of at least the service messages may be broadcast several times during one schedule period, the schedule messages associated with said one schedule period includes cues indicating, as the case may be, the broadcasts of service messages which are repetitions of service messages already broadcast during said one schedule period, and wherein when the schedule message includes a cue indicating that the broadcast of one of said service messages is a repetition of said one of said service messages already broadcast during the associated schedule period, it furthermore includes, in respect of said repetition, a sequence number of an earlier broadcast of said one of said service messages during said associated period.

17. Time division multiple access mobile radio communication station comprising transmission and reception means for communicating with a base station of a cellular radio communication network broadcasting at regular intervals on a particular radio channel service messages and schedule messages respectively associated with successive schedule periods, each schedule message including information about a distribution of the service messages which will be broadcast during the associated schedule period, wherein certain ones of at least the service messages may be broadcast several times during one schedule period, the schedule messages associated with said one schedule period includes cues indicating, as the case may be, the broadcasts of service messages which are repetitions of service messages already broadcast during said one schedule period, and wherein when the schedule message includes a cue indicating that the broadcast of one of said service messages is a repetition of said one of said service messages already broadcast during the associated schedule period, it furthermore includes, in respect of said repetition, a sequence number of an earlier broadcast of said one of said service messages during said associated period, the mobile station further comprising means for receiving and interpreting said messages operating when the mobile station is not communicating, and means for analyzing schedule messages in order to interrupt the operation of the receiving and interpreting means at moments in each schedule period, which are determined on the basis of the associated schedule message, at which the base station will rebroadcast one of said service messages already broadcast during the preceding schedule period and which the mobile station has already received during the preceding schedule period or previously.

* * * * *

UNITED STATES PATENT AND TRADEMARK OFFICE
CERTIFICATE OF CORRECTION

PATENT NO. : 5,878,033
DATED : March 2, 1999
INVENTOR(S) : Mouly

It is certified that error appears in the above-identified patent and that said Letters Patent is hereby corrected as shown below:

<u>Title page,</u>
Item [73], Assignee, should read -- Nortel Matra Cellular, Guyancourt, France --.

Signed and Sealed this

Thirteenth Day of July, 2004

JON W. DUDAS
*Acting Director of the United States Patent and Trademark Office*